Aug. 3, 1954

L. W. FALK 2,685,350

REVERSE ROTATION STOP

Filed Dec. 21, 1950

INVENTOR.
LOUIS W. FALK
BY
Miles Kenninger
ATTORNEY

Patented Aug. 3, 1954

2,685,350

UNITED STATES PATENT OFFICE 2,685,350

REVERSE ROTATION STOP

Louis W. Falk, Milwaukee, Wis., assignor to The Falk Corporation, Milwaukee, Wis., a corporation of Wisconsin Application December 21, 1950, Serial No. 201,966

3 Claims. (Cl. 188—82.77)

This invention relates to back stops, that is, to devices for preventing "back-run" or reverse rotation of a shaft in conveyor drives, hoists, elevators and the like in which a shaft should be freely rotatable in one direction but should be locked automatically against rotation in the other direction of rotation.

To provide for free running of a shaft in one direction and to positively prevent its opposite rotation from any position in which it may come to rest, back stops have heretofore been used in which a series of weighted pawls are pivoted circumferentially about a carrier or hub with arms and secured to the shaft, and in which a stationary drum is arranged around the carrier and pawls for contact therewith, of a face of each of the pawls on the drum's inner periphery. Such back stop is disclosed, for instance, in U. S. Patent 1,963,466, granted June 19, 1934, to F. W. Jury.

In the back stop disclosed in the above patent, the pawls are backed by springs reacting against the hub arms and tending to swing the pawls about their pivot centers on the carrier and into positions in which contact surfaces on the pawls would bear against the inner periphery of the drum. The shaft, carrier and pawls are free to rotate as a unit in the desired running direction of the shaft with the contact faces of the pawls bearing lightly on or spaced from the drum, but any tendency of the shaft to rotate in the opposite direction causes the contact faces of the pawls to grip the inner periphery of the drum and thereby lock the unit against back-run from any position in which the shaft has come to rest.

The yielding characteristics of the springs, the masses of the pawls and the location of the centers of gravity thereof, and the location of the pivot centers of the pawls on the carrier, are so related that, at shaft speeds within a given range, the moments of the spring pressures tending to swing the pawls about their respective pivot centers in one direction, are balanced or substantially balanced by the moments of the centrifugal force tending to swing the pawls about their respective pivot centers in the opposite direction. When driving torque is first applied to the shaft in its desired running (forward) direction, the pawl contact faces initially slide on the inner periphery of the drum but, as the shaft speed increases, the springs yield to the centrifugal force acting on the pawls so that the contact faces of the pawls separate from the inner periphery of the drum by swinging of the pawls about their respective pivot centers on the carrier. Consequently, there is no friction loss due to sliding of the pawl faces on the inner periphery of the drum after the shaft speed has reached a given minimum value, and provided that the shaft speed is steady above such value.

However, conditions may arise in drives of the character mentioned, which cause the shaft speed to fluctuate after the shaft speed is above the minimum value at which the spring forces are balanced by centrifugal force. The pawls then oscillate about their respective pivot centers on the carrier, and produce intermittent engagement of the pawl contact faces on the inner periphery of the drum which subjects the pawl faces and the drum inner periphery to undue wear, causes frictional power losses, and produces objectionable noise.

It is, therefore, an object of the invention to provide an improved pawl for use in back stops of the general construction indicated above.

Another object of the present invention is to improve the performance characteristics of back stops such as indicated above and particularly under operating conditions causing the shaft speed to fluctuate when above a given value.

A further object of the invention is to reduce pawl and drum wear, frictional losses and noise in a back stop, in a simple manner and with a minimum or no increase of manufacturing costs.

Objects and advantages other than those above set forth will be apparent from the following description when read in connection with the accompanying drawing in which.

Figure 1:
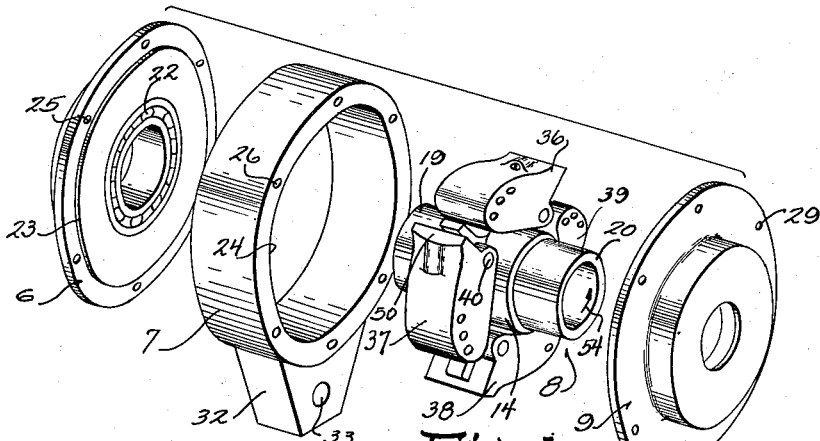
Fig. 1 is an "exploded" perspective view of a back stop mechanism embodying the present invention.
Figure 2:
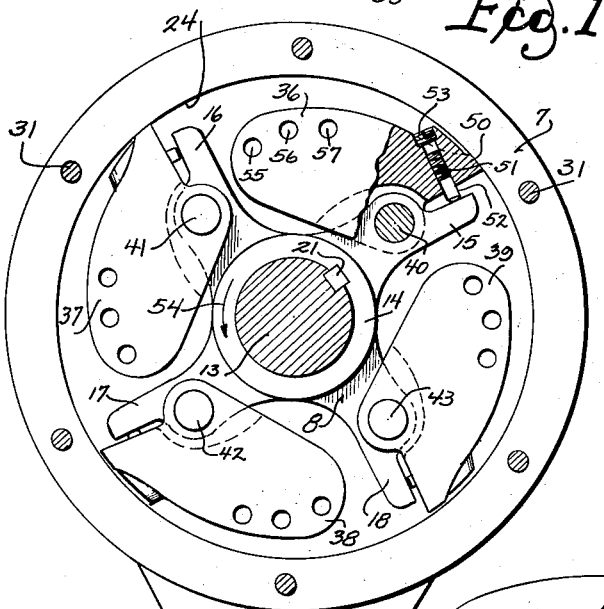
Fig. 2 is a partly elevational and partly sectional end view of the mechanism shown in Fig. 1, the end cover being omitted.

Referring to Fig. 1, the components of the back stop are shown axially separated and, from left to right, are an end cover 6, a drum or housing 7, a carrier or hub and pawl sub-combination generally designated 8, and an end cover 9. The carrier and pawl sub-assembly is adapted for mounting on a shaft (not shown in Fig. 1) indicated in Fig. 2 by the reference numeral 13. A carrier hub portion 14 has four pawl supporting arms 15, 16, 17 and 18 (see Fig. 2) extending radially therefrom, and sleeve portions 19 and 20 (see Fig. 1) extending axially from the sides thereof. When assembled, as shown in Fig. 2, the shaft 13 extends through the sleeve portions 19 and 20, and a key 21 secures the carrier against rotation relative to the shaft 13.

Mounted in the end cover 6 is an anti-friction bearing 22 for supporting the end cover on the outer surface of the sleeve portion 19, the end cover 9 also having an anti-friction bearing (not shown) for support on the outer surface of the sleeve portion 20 of the carrier. A shoulder 23 on end cover 6 engages with the inner periphery 24 of the drum, and a circumferential series of holes 25 registers with circumferential holes 26 in the drum. The right hand end cover 9 also has a pilot shoulder (not shown), and a circumferential series of holes 29 adapted to register with holes 26 in the drum 7.

The end covers 6 and 9, and the drum 7 are joined by a circumferential series of bolts 31 which extend through registering holes 25, 26 and 29, and the carrier and pawl assembly is positioned within the drum between the end covers, the end covers supporting the drum. The drum 7 has an external torque arm 32 with a hole 33 for connecting the drum to some stationary part, not shown, and thereby holding the drum and end covers assembly against rotation about the axis of the shaft 13.

Four weighted pawls 36, 37, 38 and 39 are mounted, respectively, on the hub arms 15, 16, 17 and 18 (see Fig. 2) by pivot pins 40, 41, 42 and 43. In Fig. 2, pawl 36 is shown partly in section to show that the pawl has two axially spaced lugs which straddle the hub arm 15, and that the pivot pin 40 extends parallel to the axis of the shaft 13 through aligned holes in the pawl lugs and in the hub arm. Each of the pawls has a face for contact with the inner periphery of the drum as shown at 50 for pawl 36. The pawls likewise have similar reaction spring structures of which only one is described. A helical compression spring 51 and a plunger 52 are mounted in a bore extending through a radially outer portion of the pawl in a plane at right angles to the axis of the pin 40, and midway between the axially opposite sides of the pawl. A threaded plug 53 is screwed into the pawl bore and bears upon one end of the coil spring, the other end of the spring bearing upon the plunger which in turn bears upon a generally radial extension of the hub arm 15.

It will be noted that the mass of each of the pawls is reduced by holes 55, 56 and 57 in a particular location and that the mass of each pawl is concentrated so far as practical near the pawl pivots and below a circle through the pivot axes, all for a particular purpose which will appear hereinafter.

In the position of the parts shown in Fig. 2, the spring 51 is compressed, and the pawl 36, therefore, is urged to swing in counter-clockwise direction, (as viewed in Fig. 2), about the center of the pivot pin 40. But contact face 50 bears on the inner periphery of the drum 7 and prevents pawl swinging in the counter-clockwise direction beyond the position in which the pawl is shown in Fig. 2.

The construction and mounting of the pawls 37, 38 and 39 are identical but it will be noted that the pawls 38 and 39 are tilted about their respective pivot centers on the carrier to positions in which their contact faces are separated from the inner periphery of the drum. Generally stated, any pawl may swing about its pivot center on the carrier in counter-clockwise direction of Fig. 2, to bring its contact face against the inner periphery of the drum and in clockwise direction to bring its contact face away from the inner periphery of the drum dependent on the dominance of spring force or centrifugal force.

The arrow 54 in Figs. 1 and 2 indicates the desired (forward) running direction of the shaft 13. Upon rotation of the shaft in the direction of the arrow, and initial rotation of the carrier from the position in which it is shown in Fig. 2, the contact face of the pawl 36 will slide along the smooth, cylindrical inner surface 24 of the drum. The resulting friction tends to tilt the pawl 36 slightly in clockwise direction about the axis of the pivot pin 40, and the pressure of the pawl against the drum will be slightly relieved. As the pawl 36 moves successively to the positions in which the pawls 37, 38 and 39 are shown in Fig. 2, the counter-clockwise tilting effect of the spring 51 changes due to the changing effect of the force of gravity acting upon the pawl. But for present purposes the changing effect of the force of gravity on the pawls, may be disregarded. In other words, it may be assumed that the spring of each pawl is strong enough to hold the contact face of each pawl against the drum during the initial relatively slow rotation of the shaft 13 in the forward direction.

As the shaft speed increases, centrifugal force becomes effective on each pawl and tends to swing it in clockwise direction about its pivot center on the carrier. Such clockwise swinging tendency of each pawl is opposed by its spring. But at a given shaft speed a sufficiently large centrifugal force is developed by each pawl to cause compression of its spring and consequent tilting of the pawl about its pivot center to a position such as that in which the pawl 38 is shown in Fig. 2. In such position, the contact face of the pawl is spaced from the inner periphery of the drum. The slightest separation of the pawl contact faces from the inner surface of the drum is sufficient to permit free running of the shaft in the forward direction without frictional drag of the pawls on the drum.

From Fig. 2 it will be apparent that no "back-run" or reverse rotation of the shaft, that is, rotation opposite to its desired running direction, can occur from any position in which the shaft may have come to rest. The springs of the pawls tend to swing the pawls counter-clockwise about their pivot centers, and the force of gravity has the same effect on at least one pawl after the shaft has come to rest in any position, so that any tendency of the shaft to reverse rotation causes one or more of the pawl contact faces to engage the inner surface of the drum and thereby lock the whole carrier and pawl sub-assembly against "back-run" relative to the drum. Torque on the drum, due to any "back-run" tendency of the shaft, is taken up by the torque arm 32 which is secured to some stationary part.

Figure 4:
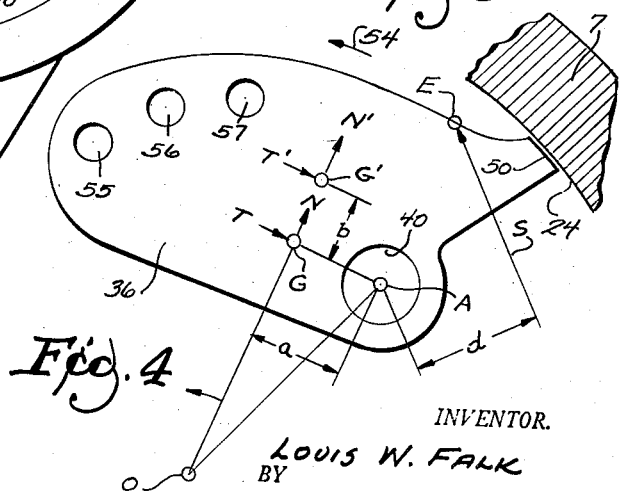
Fig. 4 is an enlarged view of a pawl forming part of the mechanism shown in Figs. 1 and 2, and includes a diagram of forces to which the pawl is subjected under certain speed conditions.

Referring now to the diagram designated Fig. 4, the turning center of the carrier is indicated at O, the pivot center of the pawl 36 is indicated at A, the center of gravity of the pawl 36 is indicated at G, and the reaction point of the spring 51 on the pawl 36 is indicated at E.

The centrifugal force to which the pawl is subjected at a speed sufficient to separate the pawl contact face from the drum periphery, acts at the center of gravity G in the direction of the carrier radius OG and with a moment arm $a$ which is the shortest distance of the pawl pivot center A from the carrier radius OG. The spring pressure S acts on the pawl at the center E with a moment arm $d$ which is the shortest distance of the pawl pivot center A from a line through the center E in the direction of the spring force S. To hold the pawl contact face away from the inner drum surface, the moment of the centrifugal force must balance the moment of the spring pressure S. Let $\omega$ designate the angular velocity in radians per second, at which the shaft must rotate to separate the contact face 50 of the pawl 36 from the inner surface of the drum 7. Let $m$ designate the mass of the pawl, and $r$ the radial distance of the center of gravity G from the shaft center O. The required balance between the moment of the centrifugal force and the moment of the spring force S is then expressed by $$am\omega^2 r = Sd \qquad (1)$$

The condition expressed by Equation 1 prevails as long as the angular velocity $\omega$ is constant. However under certain conditions, as for instance when the shaft is connected to a conveyor drive, the angular velocity $\omega$ will fluctuate, and the balance of forces expressed by Equation 1 will be disturbed.

For purposes of analysis, let it be assumed that the mechanism causing the fluctuation of the angular velocity of the shaft also superimposes thereon a harmonic vibration $\alpha$ upon the constant angular velocity $\omega$. Where $\alpha_0$ designates the maximum amplitude of the vibration and $t$ the time in seconds, such vibration is expressed by $$\alpha = \alpha_0 \sin \omega t \qquad (2)$$

In that case, the pawl is subjected both to a perpendicular (normal) acceleration $$\Delta n = (\omega + \alpha_0 \omega \sin \omega t)^2 r \qquad (3)$$

and to a tangential acceleration $$\Delta t = \alpha_0 \omega^2 \sin \omega t \qquad (4)$$

Figure 3:
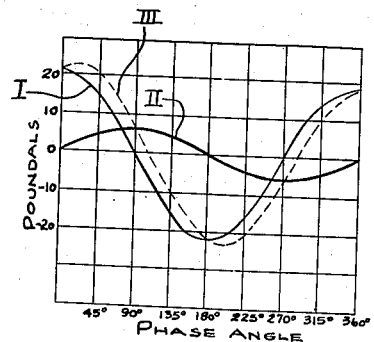
Fig. 3 is a graph showing fluctuating forces, in poundals, plotted against the phase angle of the pawl carrier and which act upon the pawls of the mechanism shown in Figs. 1 and 2, under certain speed conditions.

The normal acceleration $\Delta_n$ has the effect of a fluctuating normal force, so that $$N = m(\omega + \alpha_0 \omega \cos \omega t)^2 r \qquad (5)$$

which acts upon the pawl at the center of gravity G with the moment arm $a$, and which in combination with the spring force (torque on the pawl) $Sd$, causes the pawl to oscillate about its pivot center A. Curve I in Fig. 3 illustrates the amplitude and frequency of the normal force N produced by the normal acceleration $\Delta_n$.

The tangential acceleration $\Delta_t$, on the other hand, has the effect of a fluctuating tangential force $$T = -m\omega^2 \alpha_0 \sin \omega t \qquad (6)$$

which acts upon the pawl at the center of gravity G in a direction at right angles to the radius OG.

It is important to note that the mass of the pawl is so distributed as to place its center of gravity at or near the point at which the carrier radius OG is intersected by a pawl radius extending at right angles to the carrier radius. This particular location of the center of gravity G is significant and desirable because it prevents the tangential force T from causing oscillation of the pawl about its pivot center on the carrier. As shown in Fig. 4, the tangential force T has no moment arm by which that force could swing the pawl about its pivot center A.

For purposes of comparison of the prior structures with the present construction, an imaginery center of gravity G' is indicated in Fig. 4 at a point at which a normal force N' would have a moment arm $a$, and a tangential force T' would have a moment arm $b$. A pawl having its center of gravity at point G' would therefore be subjected, as a result of harmonic vibration, to a moment N'$a$ and to an additional moment T'$b$ which, in conjunction with the moment N'$a$, would cause the pawl to oscillate about its pivot center A on the carrier. Curve II in Fig. 3 illustrates the amplitude and frequency of the tangential force T', and curve III in Fig. 3 illustrates the combined effect of the normal and tangential forces N' and T' upon a pawl having a pivot center at G'. It will be noted that the amplitude of curve III is appreciably greater than the amplitude of curve I. Hence, a pawl constructed in accordance with the present invention with its center of gravity located at or near the point at which a carrier radius through the center of gravity is intersected by a pawl radius at right angles to said carrier radius, is less sensitive to speed fluctuations of the driving shaft than a pawl of the known construction in which the center of gravity is spaced a substantial distance from the above defined intersection point.

To achieve the improved results above stated, it is essential that the radial distance of the center of gravity of the pawl from the turning center of the carrier be no greater than the radial distance of the pawl pivot center from the turning center of the carrier. Also to achieve the above results, the mass at the leading end of the pawl is reduced by holes 55, 56, 57 through the body of the pawl in radially spaced relation to the pivot center of the pawl and the pawl is cut away adjacent its pivot only sufficiently to provide clearance of the pivot for pawl movement of a few degrees.

Although but one embodiment of the present invention has been illustrated and described, it will be apparent that various changes and modifications may be made therein without departing from the invention as defined in the appended claims.

I claim:

1. A back-stop comprising a substantially stationary drum having an internal braking surface, a shaft extending into the drum and concentric therewith, a pawl carrier fixed on the shaft for rotation therewith, a pawl pivoted on the carrier for movement by centrifugal force out of contact with the drum braking surface upon rotation of the carrier in one direction, and a spring acting between the carrier and the pawl for urging the pawl toward the braking surface and into contact therewith upon reduction in rotative speed of the carrier below a predetermined value, the pawl having the center of gravity thereof located at the intersection at a right angle of lines severally through the pawl pivot and the rotation center of the carrier whereby inertia forces resulting from fluctuations in rotational speed of the carrier act only through the pawl pivot.

2. A back-stop comprising a substantially stationary drum having an internal braking surface, a shaft extending into the drum and concentric therewith, a pawl carrier fixed on the shaft for rotation therewith, a pawl pivoted on the carrier for movement by centrifugal force out of contact with the drum braking surface upon rotation of the carrier in one direction, and a spring acting between the carrier and the pawl for urging the pawl toward the braking surface, the pawl having the center of gravity thereof located at the intersection at a right angle of a radius of the gear and a radius of the pawl pivot whereby inertia forces resulting from fluctuations in speed of the carrier act on a line through the axis of the pawl pivot.

3. A rotary back-stop comprising a non-rotary drum having an internal braking surface, a carrier mounted for rotation within said drum about an axis concentric thereto, a plurality of pawls pivotally mounted on said carrier for rotation therewith, each of said pawls being rockable into and out of engagement with said surface, resilient means urging said pawls into engagement with said surface when said carrier is at rest to thereby hold said carrier against rotation in one direction, said pawls being centrifugally urged from engagement with said surface by rotation of said carrier in the opposite direction, the center of gravity of each of said pawls being disposed substantially at the intersection at right angle of two lines respectively extending through the pawl pivot and through the axis of rotation of said carrier, whereby the pivotal positions of said pawls are unaffected by inertia forces resulting from variations in rotative speed of said carrier.

References Cited in the file of this patent

UNITED STATES PATENTS

| Number | Name | Date |
|---|---|---|
| 1,963,466 | Jury | June 19, 1934 |